United States Patent Office 2,908,464
Patented Oct. 13, 1959

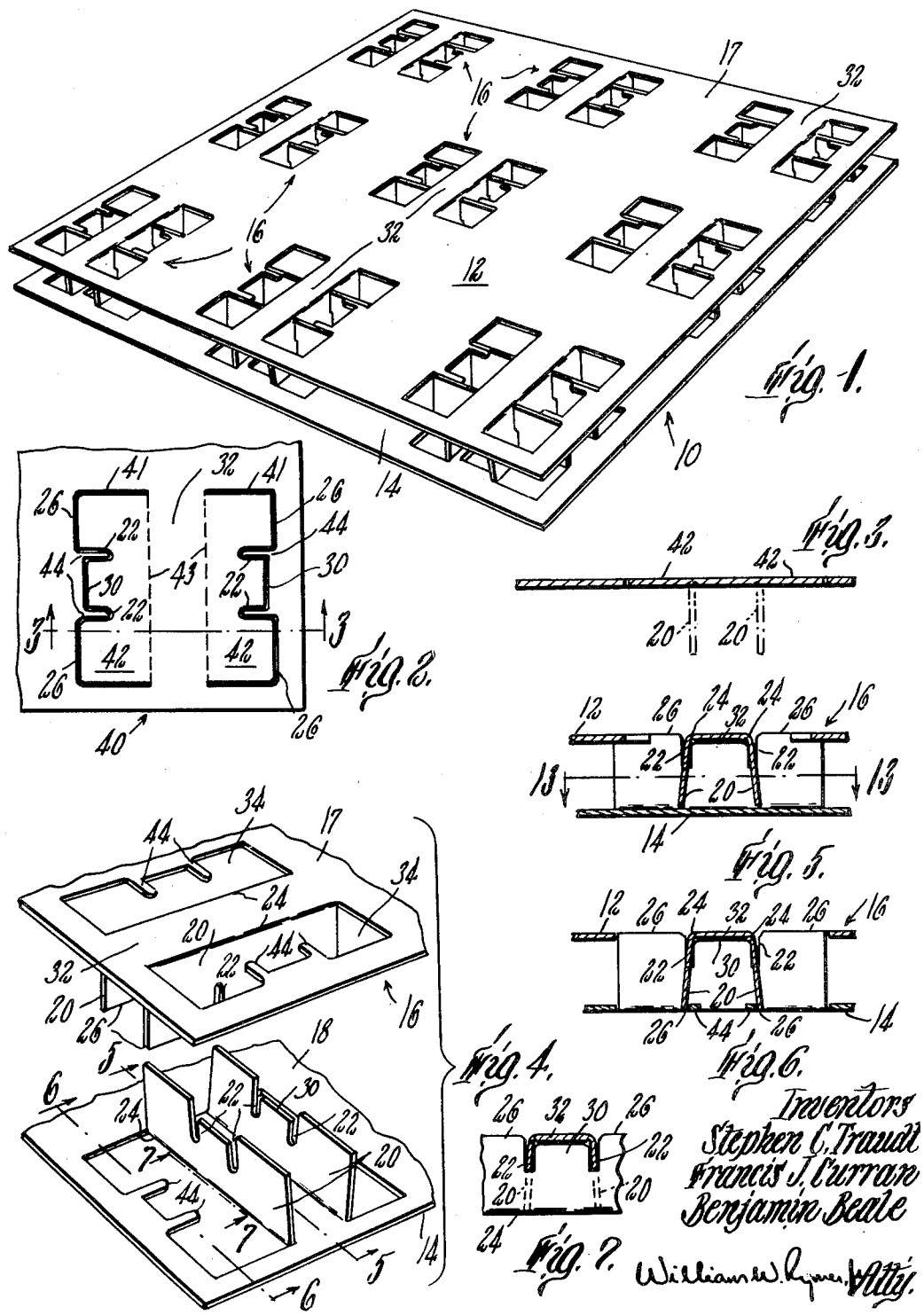

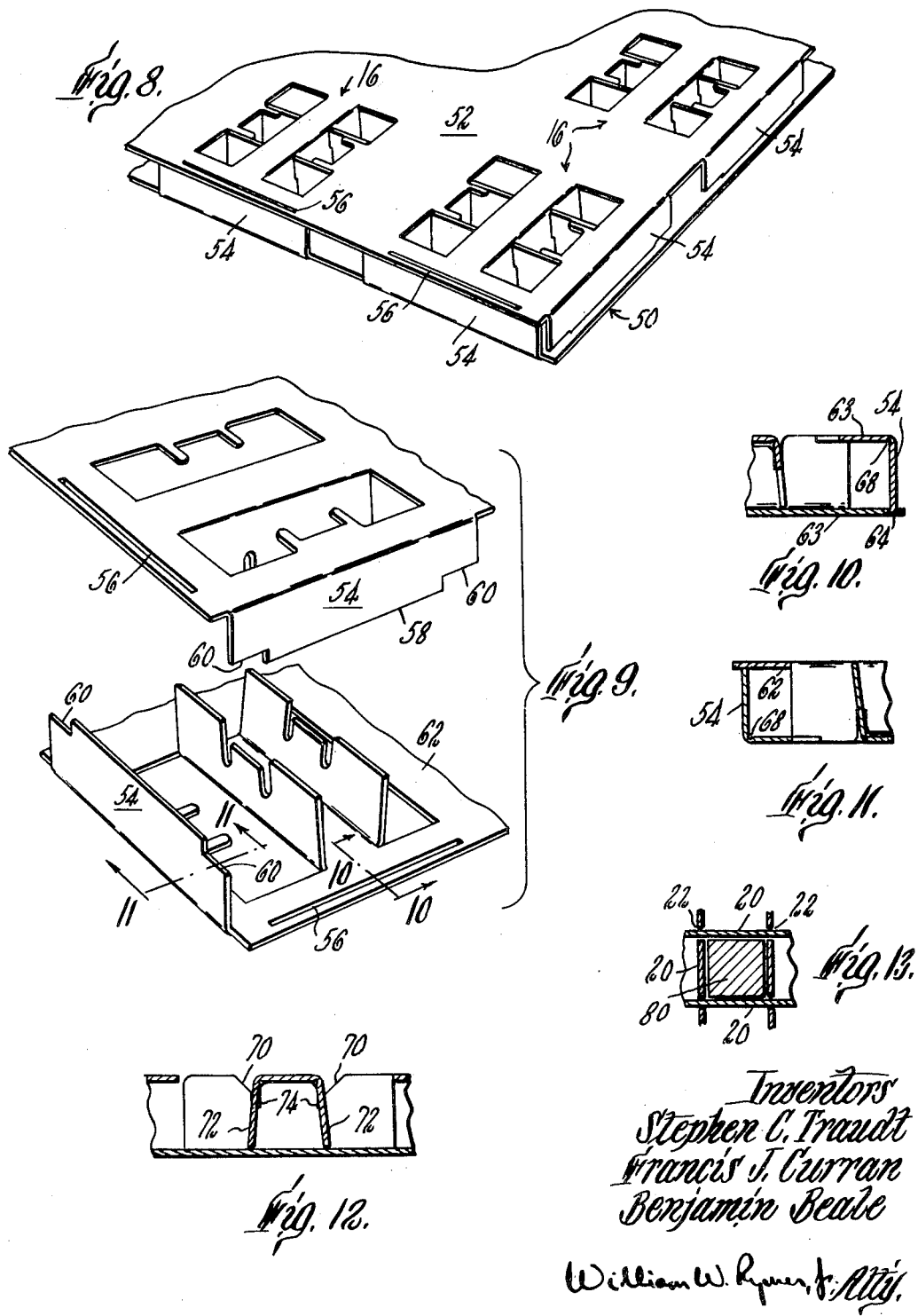

2,908,464

PALLET

Stephen C. Traudt and Francis J. Curran, Norwood, and Benjamin Beale, Westwood, Mass., assignors to Bird & Son, Inc., East Walpole, Mass., a corporation Application January 26, 1956, Serial No. 564,844

7 Claims. (Cl. 248—120)

This invention relates to pallets, and more particularly to pallets which may be quickly assembled or disassembled by frictionally engaging a pair of pallet-forming elements or portions and to blanks especially adapted to be folded out to provide such pallet elements or pallet-forming portions.

A leading object is to provide pallets which may be completely assembled for use without gluing, stapling, or using any other extraneous attaching means or tools.

A further object is to provide such pallets which may be completely assembled merely by pushing together only two pallet elements or pallet-forming portions, to interlock the same frictionally.

A further object is to provide such pallets in which said pallet elements are made from flexible sheet material blanks, which may be shipped in flat form to avoid the space wastage characteristic of assembled pallets, and may be quickly and easily folded out for assembly; or may be just as quickly and easily disassembled and again folded back to flat condition for storage or shipment.

Another object is to provide such a pallet which is reversible so that either outside face thereof may be used as a load-bearing surface to support any objects to be carried thereon.

A further object is to provide such pallets, and blanks for making up the same which may be formed of inexpensive sheet material such as fiberboard or corrugated cardboard, so that the same may be regarded as disposable if it is preferred not to reship or otherwise reuse.

Another object is to provide such a pallet in which forks of a fork lift truck may be introduced at any or all of the four sides thereof.

Another object is to provide such pallets which may be set up from or disassembled to a pair of pallet elements or blanks by rapid automatic machinery.

A particular advantage is that in any case pallets according to the invention may, if desired, be made up simply by frictionally interlocking a pair of pallet-forming portions, or elements, so that if desired only a single type blank need be carried in inventory.

Still another object is to provide modifications of such pallets in which there is increased support against collapse at the marginal edges thereof.

Still another advantage is that the element or blank may be manufactured from the fiberboard or other sheet material by cutting and slitting the same, without necessitating any production of waste.

Other objects, features, and advantages will appear from the following description of preferred embodiments taken together with the drawings thereof, in which:

Fig. 1 is a perspective view of a pallet embodying the invention in a presently preferred form;

Fig. 2 is a partial plan view of blank from which one of the pair of like elements making up the embodiment of Fig. 1 is formed;

Fig. 3 is a partial cross-sectional view through Fig. 2 at 3—3 thereof, showing in dotted lines the supports folded down in position for assembly;

Fig. 4 is an exploded isometric view of a portion of the two said like elements, showing them in position for assembly together in interlocking relation;

Fig. 5 is a partial sectional view of the assembled elements of Fig. 4, at 5—5 thereof;

Fig. 6 is a partial sectional view of the assembled elements of Fig. 4, at 6—6 thereof;

Fig. 7 is a partial sectional view of the assembled elements of Fig. 4, at 7—7 thereof;

Fig. 8 is a perspective view of a portion of a modification embodying the invention;

Fig. 9 is an exploded isometric view of a portion of the two like elements of the modification of Fig. 8, showing the same in position for assembly together in interlocking relation;

Fig. 10 is a partial cross-sectional view through the assembly according to Fig. 9, at 10—10 thereof;

Fig. 11 is a partial cross-sectional view through the same at 11—11 thereof;

Fig. 12 is a partial sectional view of still another modification of the invention, taken therethrough in position corresponding with the section in Fig. 5; and Fig. 13 is a partial sectional view of still another modification, taken at a line corresponding to 13—13 of Fig. 5.

Referring now to the drawings, there is shown in Fig. 1 a presently preferred embodiment of a pallet according to the invention.

Said preferred embodiment of the pallet, indicated generally at 10, comprises a pair of frictionally interlocked like elements 12 and 14, hereinafter described, and contains nine support stations in three rows of three each. At each said support station, indicated generally at 16, the two elements 12 and 14 are spaced from, and supported with reference to, each other.

Each element 12 and 14 is formed from a single integral piece of thin sheet material such as fiberboard or corrugated cardboard (though other sheet material, including for example metallic or plastic material could be used), and comprises an outer load-bearing surface 17, an inner surface 18, and a multiplicity of inwardly extending supports 20. A pallet 10 is assembled by frictionally interlocking the supports 20 of two elements 12 and 14 one of said elements being first rotated in a horizontal plane 90° with reference to the other so that each notch 22 of each support 20 on each element 12 and 14 may accept a support 20 of the other element. When two elements are brought into such relation and pressed together, frictional forces hold them together, the notches 22 being just wide enough to accept the thickness of supports 20. This frictional locking is accentuated in the preferred embodiment because each element 12 and 14 is formed from a single slitted sheet, the supports 20 being folded inwardly therefrom, and such supports retain a tendency to revert toward their original unfolded position which makes them press themselves firmly against an edge of each notch 22 to increase frictional forces. (See Figs. 5 and 6, which show each support 20 bent slightly out of perpendicular to the surfaces 17 and pressed against an edge of a notch 22. Such supports are "substantially perpendicular" to the load-bearing surfaces in that they carry the load without collapse.)

At each support station or compression station 16, four supports 20 are interlocked with one another in this manner, two of said supports extending inwardly from each of the elements 12 and 14 at each said compression station.

Each support 20 includes an inner folding edge 24 along which said support is integral with the element 12 or 14, and parallel thereto, a pair of outer support edges 26. The inner surface 18 is preferably indented to facilitate folding, as shown in Figs. 3, 5 and 6. Extending perpendicularly inwardly from the support edges 26 toward said folding edge 24, are a pair of notches 22. Each notch 22 is just wide enough to accommodate the thickness of a support 20. Extending between the notches 22 on each support 20 is the central support edge 30, which like the support edges 26 is parallel to the folding edge 24. The central support edge 30 is inset from the support edges 26 a distance corresponding to the thickness of the portions 32 between the supports 20 on the elements 12 and 14.

The supports 20 of each pair thereof are spaced apart a distance corresponding to the distance between notches 22 of a single support 20.

In the embodiment shown, a hole 34 of shape corresponding with the support 20 is located on each side of the portion 32.

When a pair of elements 12 and 14 are frictionally interlocked as above described, each support 20 at each compression station 16 of each element accepts the pair of supports 20 of the corresponding compression station 16 of the mating element, one support being accepted by each notch 22; and each support being in turn accepted by two notches 22 of two opposing supports 20. Because the width of the notches is just sufficient to accept the thickness of the supports, the supports are held thereby substantially perpendicular (as shown in Figs. 5 and 6, above referred to) to the surfaces 17 and 18 despite application of heavy compression loads, resisting bending that would result in collapse. Each pair of supports 20 of one element 12 or 14 at a particular compression station meshes easily with the notches 22 of the opposite element thereat, since each said pair of supports 20 is spaced apart a distance corresponding with the distance between notches on a single support. The inner extremities of the notches 22 of the opposed interlocked supports 20 seat against one another (as best shown in Fig. 7) to space the outer load-bearing surfaces 17 of the elements 12 and 14 the predetermined distance apart, and also to provide points of load-bearing support. Additional support is provided by the support edges 26 of the supports, said support edges 26 extending through the holes 34 and lying in substantially the same planes as the opposed outer load-bearing surfaces 17 of the two elemetns. Still further support is achieved along the central support edges 30, which rest against the inner surface 18 of the opposing element 12 or 14. The notches 22 extend along the supports 20 a suitable distance to provide for support as just described, said distance being substantially one-half the distance from the support edges 26 of an element to the outer load-bearing surface 17 thereof.

In Figs. 2 and 3 are shown portions of a preferred blank in accordance with the invention. In the blank, indicated generally at 40, the portions 42 which upon folding out as indicated along the indentations 43 (which become the folding edges 24) form the supports 20 are part of the single flat sheet constituting the blank 40, and are defined by slits extending therethrough. The blank may suitably be formed from corrugated cardboard or from fiberboard, or other sheet material of suitable strength, for example plastic or metal.

In slitting to define the portions 42, tongues 44 are left adjacent the notches 22. These tongues may be removed if desired, but in the preferred embodiment such tongues are left in position to avoid necessity of dealing with waste cuttings in manufacture. As shown in Fig. 6, the support edges 26 fall alongside said tongues in the preferred embodiment of the assembled pallet, so that said tongues give no difficulty if left to remain in the preferred embodiment.

A modification of the invention is shown in Figs. 8 through 11. In this modification there is provided increased strength against collapse at the marginal edges of the pallet, as may be desirable when non-rigid containers, as bags of sugar, are loaded thereon.

The pallet of this embodiment, indicated generally at 50, includes two like pallet elements 52, disposed at an angle of 90° to each other and frictionally interlocked as shown particularly in Fig. 9. The pallet elements 52 differ from the elements 12 and 14 only in that there is additionally provided adjacent each compression station 16 along two of the four marginal edges of each element 52 locking supports 54 extending inwardly toward, and engaging slots 56 of, the opposed interlocking element 52. Each pallet element thus has on the other two of its four marginal edges, beside each compression station 16, such a slot 56.

Each locking support 54 includes a central projection 58 of size to fit snugly into a slot 56. Each locking support 54 includes on both sides of the projection 58 support edges 60 which in the pallet 50 rest against the inner surface 62 to provide support against pallet compression. The projection 58 extends beyond said edges 60 a distance corresponding to the thickness of the sheet material of which the pallet element is formed, so that the edge 64 thereof lies in generally the same plane as the outer or load-bearing surface 63 of the mating element 52, so that the edge 64 also acts as a support edge.

It will be seen thus that in this embodiment, not only is there achieved the support characteristic of the first-described embodiment, but additionally there are around the marginal edges of the pallet twelve locking supports 54. Ample room for 4-way fork lift truck engagement remains between the locking supports 54.

This embodiment like the embodiment first described has the advantage that only one style blank need be carried in stock. Two such blanks may then be folded in as in Fig. 9, angularly rotated to engage each other, and pushed together for frictional interlocking. The folding edges of the locking supports preferably are provided with indentations 68 to facilitate folding.

Another manner in which the embodiment of Fig. 1 may be given increased strength against marginal collapse is by providing upstanding members around all the marginal edges of the upper pallet element, more or less in the manner of an inverted candy box. Such upstanding members could be folded up after shipment and overlapped and stapled (or cemented, interlocked, or fastened by other means) at the corners. This would provide for flat shipment. It is of course true that in this case two types of blanks would be required, one making provision for the upstanding marginal portions for the upper pallet element, and the other being as in Fig. 1. A pallet having such an upstanding marginal edge would also have the disadvantage of not being reversible, unlike the embodiments described above. On the other hand, it would have the additional advantage that certain types of packages might be more efficiently retained in position because of the upstanding edges.

Still another modification is shown in Fig. 12. In this embodiment a corner is removed from the supports disclosed in Fig. 4, to provide beveled edges 70 on the support 72 adjacent each notch 74. This provides flaring mouths for the notches, to provide for additional ease of assembly.

A further embodiment is shown in Fig. 13. In this embodiment solid support blocks 80, for example of wood, have been inserted, during assembly, in the zones between the two pallet elements and enclosed by the four supports 20 at each support station 16, for added strength in compression.

Instead of using two blanks and two separate pallet elements (each constituting thus a separate pallet-forming portion of the assembled pallet) to make up pallets according to the invention, a single blank or unit comprising two pallet-forming portions, each corresponding to a pallet element as above, may be used, the supports extending from the two portions respectively being properly oriented angularly, e.g., those of one portion being oriented at an angle of 90° to those of the other portion. A connecting zone may suitably extend between such pallet-forming portions, being of width corresponding to the distance between the upper and lower portions of the assembled pallet. Holes may be provided in this connecting zone to provide for entry of forks of a fork lift truck on this as well as the other three sides of a completed pallet.

In the preferred embodiment, two like pallet-forming elements are assembled together, as above described. However, two elements which are unlike may be used if desired. For example, if rectangular pallets are desired, cuts defining support areas will be made at different angles to the respective longitudinal axes in any pair of blanks to be folded out and interlocked, since in this case the effect cannot be achieved as a practical matter by rotating one element with respect to the other, the banks not being square in shape.

Instead of of the pallet elements' or pallet-forming portions' interlocking directly with each other, each may at each compression station lock with opposite ends of a tubular member, preferably square in cross-section, with each side of the square being of length corresponding to the distance between notches of a support, though such member might be round or of other shape suitable to engage the notches. Thus the same pallet elements may not only be interlocked, but have the additional advantage that alternatively they may be used together with extension members extending therebetween, to give pallets of greater height.

Other embodiments within the spirit of the invention will readily occur to those skilled in the art. For example, instead of a multiplicity of compression stations at each of which a pair of supports were folded down by oppositely rotating the same thereat, a multiplicity of supports rotating downwardly in the same direction might be employed. More or less than two such supports might be used in a group or support station, each support having a number of notches corresponding with the number of supports in the group. If very slight support were needed, or the sheet material used strong enough, a total of three supports on each element, each including three notches and extending across substantially the entire width thereof, would be sufficient.

A continuous sheet could be attached over the load-bearing surfaces of the pallet-forming portions or pallet elements, so that no holes would appear in such surfaces, obvious adjustments in the dimensions of the supports being made as needed.

Or a pallet element could be made by attaching supports to a continuous sheet for folding out therefrom. For example, the slits defining the edges 41 (Fig. 2) might be extended into each other to cut out a unit having a pair of support portions 42, indentations 43, and the area 32 between the latter. This unit might than suitably be cemented or stapled to the continuous sheet over the area 32.

We claim:

1. A pallet comprising a pair of like pallet elements rotated 90° with respect to each other and frictionally interlocked for mutual retention and support at nine support stations arranged in three rows of three each, each said pallet element being formed from sheet material and including a load-bearing surface on one face thereof and a multiplicity of supports folded out from the other face thereof, there being two such supports corresponding to each said support station, said supports of the respective pallet elements extending toward and accepting one another at reentrant notches therein, each said support carrying a pair of said reentrant notches, said notches being sufficiently narrow to hold the supports accepted thereby in substantially perpendicular relation to said load-bearing surfaces, being spaced apart a distance corresponding to the distance between supports of a pallet element at each said support station, and extending in length for substantially one-half the length of said supports, the inner extremity of each notch resting against the inner extremity of a mating notch, each said pallet element including holes adjacent said supports through which support edges of supports of the mating pallet element extend to lie in substantially the same plane as said load-bearing surface of the former said pallet element, each said support being inset intermediate said notches thereof a distance corresponding to the thickness of said sheet material to provide a central support edge to rest against the inner surface of the opposed pallet element, said support stations being spaced apart to permit entry therebetween of forks of a fork lift truck.

2. A pallet comprising two substantially parallel pallet-forming portions of generally flat sheet material, each suitable to provide a working surface, and a multiplicity of notched supports foldably integral with said pallet-forming portions along one edge of each thereof, said supports extending from the pallet-forming portion with which they are integral toward the other pallet-forming portion, and said supports extending from one pallet-forming portion being frictionally interlocked for mutual retention with supports extending from the other pallet-forming portion at notches in said supports, the interlocking supports defining support stations, said support stations being spaced apart to permit entry therebetween of forks of a fork-lift truck.

3. The pallet of claim 2 in which said pallet-forming portions are two separate but identical elements one of which is rotated 90° relative to the other.

4. The pallet of claim 3 in which said pallet-forming portions are fiberboard.

5. The pallet of claim 3 in which each said pallet-forming portion includes a multiplicity of locking supports, each terminating in a projection, spaced around the marginal edges thereof, certain of said locking supports extending from one said portion and with the projections thereof being received by mating slots in the other said portion, and the remainder of said locking supports extending from the latter said portion and with the projections thereof being received by the first-mentioned said said portion, edges of each said locking support along said projection and on each side thereof providing support against marginal collapse.

6. The pallet of claim 3 in which each said support station consists of four supports, two parallel supports extending from each said pallet-forming portion, each said support carrying a pair of notches spaced apart a distance corresponding to the distance between the parallel supports extending from one of said pallet-forming portions.

7. The pallet of claim 6 in which a multiplicity of support blocks are held between said pallet elements and enclosed by said supports.

References Cited in the file of this patent

UNITED STATES PATENTS

| | | |
|---|---|---|
| 682,306 | Woolsey | Sept. 10, 1901 |
| 1,250,090 | Carter | Dec. 11, 1917 |
| 1,996,490 | Romanoff | Apr. 2, 1935 |
| 2,692,747 | Strauss | Oct. 26, 1954 |
| 2,696,356 | Baumann | Dec. 7, 1954 |
| 2,697,547 | Wagonseller | Dec. 21, 1954 |
| 2,709,559 | Geisler | May 31, 1955 |

FOREIGN PATENTS

| | | |
|---|---|---|
| 762,397 | France | Jan. 22, 1934 |